(12) United States Patent
Kang

(10) Patent No.: US 11,829,858 B2
(45) Date of Patent: *Nov. 28, 2023

(54) METHOD OF TRAINING NEURAL NETWORK BY SELECTING DATA TO BE USED IN A SUBSEQUENT TRAINING PROCESS AND IDENTIFYING A CLUSTER CORRESPONDING TO A FEATURE VECTOR

(71) Applicant: SAMSUNG ELECTRONICS CO., LTD., Suwon-si (KR)

(72) Inventor: Hyoa Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 143 days.

This patent is subject to a terminal disclaimer.

(21) Appl. No.: 17/132,201

(22) Filed: Dec. 23, 2020

(65) Prior Publication Data

US 2021/0110212 A1 Apr. 15, 2021

Related U.S. Application Data

(63) Continuation of application No. 15/691,916, filed on Aug. 31, 2017, now Pat. No. 10,902,292.

(30) Foreign Application Priority Data

Dec. 15, 2016 (KR) ........................ 10-2016-0171650

(51) Int. Cl.
*G06V 30/194* (2022.01)
*G06V 10/82* (2022.01)
(Continued)

(52) U.S. Cl.
CPC ............. *G06N 3/04* (2013.01); *G06F 18/214* (2023.01); *G06F 18/217* (2023.01);
(Continued)

(58) Field of Classification Search
CPC .. G06K 9/6292; G06K 9/6218; G06K 9/6228; G06T 7/00; G06T 2207/20084;
(Continued)

(56) References Cited

U.S. PATENT DOCUMENTS 5,161,204 A 11/1992 Hutcheson et al.
5,274,714 A * 12/1993 Hutcheson ........... G06V 30/194
382/280

(Continued)

FOREIGN PATENT DOCUMENTS

JP 2005-182686 A 7/2005
JP 2005-284833 A 10/2005

OTHER PUBLICATIONS

Du et al., Clustering: A neural network approach, Neural Networks, vol. 23, Issue 1, 2010, pp. 89-107, //doi.org/10.1016/j.neunet.2009.08.007.*

(Continued)

*Primary Examiner* — Guillermo M Rivera-Martinez
(74) *Attorney, Agent, or Firm* — NSIP Law

(57) ABSTRACT

A training method of a neural network, and a recognition method and apparatus using the neural network are disclosed. The recognition method using the neural network includes obtaining a feature vector generated from a hidden layer of the neural network, in response to data being entered to an input layer of the neural network, and determining a reliability of a recognition result for the data using the feature vector and clusters.

18 Claims, 10 Drawing Sheets

(51) Int. Cl.
*G06N 3/04* (2023.01)
*G06N 3/084* (2023.01)
*G06F 18/21* (2023.01)
*G06F 18/214* (2023.01)
*G06F 18/232* (2023.01)
*G06F 18/2413* (2023.01)
*G06V 30/19* (2022.01)

(52) U.S. Cl.
CPC ........ *G06F 18/232* (2023.01); *G06F 18/2414* (2023.01); *G06N 3/084* (2013.01); *G06V 10/82* (2022.01); *G06V 30/194* (2022.01); *G06V 30/1916* (2022.01); *G06V 30/19147* (2022.01); *G06V 30/19173* (2022.01)

(58) Field of Classification Search
CPC .......... G06T 2207/20081; G06V 30/36; G06V 10/7715; G06V 20/698; G06V 10/82
See application file for complete search history.

(56) References Cited

U.S. PATENT DOCUMENTS

| | | | |
|---|---|---|---|
| 5,461,698 A | 10/1995 | Schwanke et al. | |
| 5,548,512 A | 8/1996 | Quraishi | |
| 6,546,117 B1 | 4/2003 | Sun et al. | |
| 6,556,980 B1 | 4/2003 | Cheng | |
| 7,471,997 B2 | 12/2008 | Tezuka | |
| 9,015,093 B1 | 4/2015 | Commons | |
| 9,406,017 B2 | 8/2016 | Hinton et al. | |
| 2004/0042665 A1 | 3/2004 | Il et al. | |
| 2004/0096107 A1* | 5/2004 | Ii | G06K 9/6228 382/224 |
| 2005/0100209 A1* | 5/2005 | Lewis | G06K 9/6262 382/224 |
| 2007/0217676 A1 | 9/2007 | Grauman et al. | |
| 2008/0154816 A1* | 6/2008 | Xiao | G06N 3/02 706/15 |
| 2014/0079297 A1* | 3/2014 | Tadayon | G06V 40/172 382/118 |
| 2014/0229158 A1 | 8/2014 | Zweig et al. | |
| 2014/0365195 A1* | 12/2014 | Lahiri | G06N 3/02 703/12 |
| 2016/0055427 A1* | 2/2016 | Adjaoute | G06N 20/00 706/12 |
| 2016/0162760 A1 | 6/2016 | Skaff et al. | |
| 2016/0174902 A1* | 6/2016 | Georgescu | G06V 10/82 600/408 |
| 2016/0321541 A1 | 11/2016 | Liu et al. | |
| 2017/0161590 A1 | 6/2017 | Boulkenafed et al. | |
| 2017/0169331 A1* | 6/2017 | Garner | G05B 13/00 |
| 2017/0270406 A1 | 9/2017 | Visser et al. | |
| 2017/0357896 A1 | 12/2017 | Tsatsin et al. | |
| 2018/0032801 A1 | 2/2018 | Gur et al. | |
| 2018/0247107 A1 | 8/2018 | Murthy et al. | |

OTHER PUBLICATIONS

Murata, Noboru, et al. "Network information criterion-determining the number of hidden units for an artificial neural network model." IEEE Transactions on Neural Networks 5.6 (1994): 865-872.

Provost, Foster. "Machine learning from imbalanced data sets 101." Proceedings of the AAAI'2000 workshop on imbalanced data sets. (2000): 1-3.

Park, Sang Wook et al. "Learning constructive RBF networks by active data selection." Master's thesis—engineering. Department of Electrical and Computer Engineering, The Graduate School, Seoul National University. (2001): 1-40.

Karayiannis et al., An Integrated Approach to Fuzzy Learning Vector Quantization and Fuzzy—Means Clustering, 1997, IEEE Transactions On Fuzzy Systems, vol. 5, No. 4, Nov. 1997, pp. 622-628.

Abraham et al., 129: Artificial Neural Networks. Handbook of Measuring System Design, 2005, John Wiley & Sons, Ltd. ISBN: 0-470-02143-8, pp. 901-908.

Farabet, Clément, et al. "Learning hierarchical features for scene labeling." IEEE transactions on pattern analysis and machine intelligence 35.8 (2013): 1915-1929.

* cited by examiner

METHOD OF TRAINING NEURAL NETWORK BY SELECTING DATA TO BE USED IN A SUBSEQUENT TRAINING PROCESS AND IDENTIFYING A CLUSTER CORRESPONDING TO A FEATURE VECTOR

CROSS-REFERENCE TO RELATED APPLICATION(S)

This application is a continuation of U.S. patent application Ser. No. 15/691,916 filed on Aug. 31, 2017 which claims the benefit under 35 USC § 119(a) of Korean Patent Application No. 10-2016-0171650 filed on Dec. 15, 2016, in the Korean Intellectual Property Office, the entire disclosures of which are incorporated herein by reference for all purposes.

BACKGROUND

1. Field

The following description relates to a method of training a neural network, and a recognition method and apparatus using the neural network.

2. Description of Related Art

Research into applying a human recognition method to a device is in progress to solve a complex issue. Such research include using a neural network that is modeled after human biological neurons. The neural network uses an algorithm that imitates a learning ability of a human being. The neural network may perform mapping between an input pattern and output patterns through learning or training. In addition, the neural network may possess a generalization ability to generate a relatively correct output in response to an input pattern that is not used for previous learning or training based on a result from learning or training.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, there is provided a recognition method using a neural network, the method including obtaining a feature vector generated from a hidden layer of the neural network, in response to data being entered to an input layer of the neural network, and determining a reliability of a recognition result for the data using the feature vector and clusters.

The determining of the reliability may include determining the reliability of the recognition result by calculating a distance between the feature vector and each of the clusters.

The determining of the reliability may include determining the reliability of the recognition result to be higher, in response to the distance between the feature vector and the clusters being shorter.

The determining of the reliability may include determining the reliability of the recognition result by calculating a similarity between the feature vector and each of the clusters.

The each of the clusters may be determined based on feature vectors of pieces of training data to be used to train the neural network.

The feature vectors are obtained from the hidden layer of the neural network.

The each of the clusters may include information related to any one or any combination of a centroid of the each of the clusters, a boundary information the each of the, a number of pieces of data in the each of the clusters, a distribution for the each of the clusters, an outlier that abnormally deviates from a feature vector distribution of the each of the clusters, and statistical values of feature vectors included in the each of the clusters.

In another general aspect, there is provided a training method of a neural network, including obtaining a feature vector generated from a hidden layer of the neural network, in response to training data being received at an input layer of the neural network, identifying a cluster corresponding to the training data from a plurality of clusters based on the feature vector, and training the neural network using the identified cluster, in response to an accuracy of recognition for the training data being less than a threshold.

The training of the neural network may include training the neural network using training data in the identified cluster.

The training of the neural network may include training the neural network by setting a weight of a loss of the training data in the identified cluster to be higher than a weight of a loss of other training data, wherein the other training data may include the training data excluding the training data in the identified cluster.

The plurality of clusters may be determined based on feature vectors of pieces of training data in a training set of the neural network.

The plurality of clusters may be updated based on a feature vector obtained in the training process, in response to the training of the neural network being performed.

The accuracy of the recognition may include a loss determined based on an estimated value output from the neural network in response to the training data and a correct value corresponding to the training data.

The training of the neural network may include training the neural network using a cluster corresponding to validation data having a lowest recognition accuracy among pieces of validation data in a validation set of the neural network.

The validation data may be different from the training data.

In another general aspect, there is provided a recognition apparatus including a processor configured to recognize data using a neural network, obtain a feature vector generated from a hidden layer of the neural network in response to receiving the data at an input layer of the neural network, and determine a reliability of a recognition result for the input data using the feature vector and clusters.

The recognition apparatus of claim 17, wherein the processor is further configured to determine the reliability of the recognition result by calculating a distance between the feature vector and each of the clusters.

The processor may be configured to determine the reliability of the recognition result by calculating a similarity between the feature vector and each of the clusters.

The clusters may be determined based on feature vectors of pieces of training data to be used to train the neural network.

Other features and aspects will be apparent from the following detailed description, the drawings, and the claims.

Figure 1:
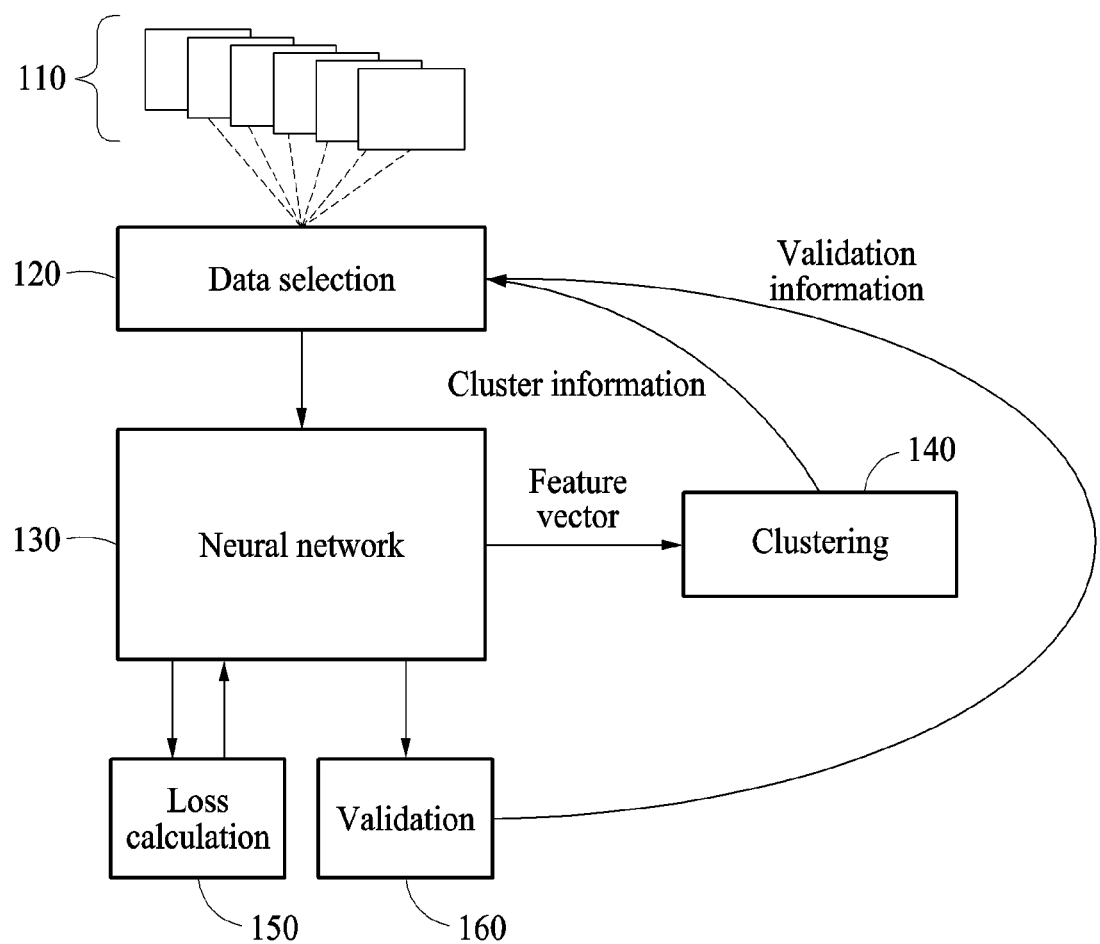
FIG. 1 is a diagram illustrating an example of a training process of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

The following example embodiments may be applicable to help train a neural network or recognize input data using the neural network. The example embodiments may be embodied as various types of devices such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, a smart television (TV), a high definition television (HDTV), a smart appliance, an optical disc player, a DVD player, a Blue-ray player, a setup box, robot cleaners, a home appliance, a smart appliance, content players, communication systems, image processing systems, graphics processing systems, other consumer electronics/information technology (CE/IT) device, various Internet of Things (IoT) devices that are controlled through a network, a smart vehicle, an intelligent automobile, an autonomous driving vehicle, or any other device capable of wireless communication or network communication consistent with that disclosed herein. For example, the example embodiments may be applicable to train a neural network or recognize input data using the neural network in any of the devices described above.

FIG. 1 is a diagram illustrating an example of a training process of a neural network.

Referring to FIG. 1 shown data being selected to train a neural network 130. The neural network 130 includes a plurality of layers, and each of the layers includes a plurality of neurons. Neurons of neighboring layers are connected through a plurality of synapses. Based on training, weights are assigned to the synapses, and parameters include such weights.

In an example, the layers of the neural network 130 include an input layer, a hidden layer, and an output layer. For example, the input layer receives an input to perform training or recognition, and transfers the input to the hidden layer. In an example, the output layer generates an output of the neural network 130 based on a signal received from neurons of the hidden layer. The hidden layer refers to a middle layer disposed between the input layer and the output layer. In an example, the hidden layer converts, to a predictable value, training data transferred through the input layer or data to be recognized.

In one example, a plurality of pieces of training data 110 that are to be used for training the neural network 130, are included in a training set. In an example, when training the neural network 130, all of the training data 110 are not input, at once to the neural network 130. In an example, the pieces of training data 110 are divided by a number to divide the training data into groups to train the neural network 130. Training the neural network 130 once using the a number of the pieces of training data that is divided into one group is referred to as one iteration, and training the neural network 130 using all the pieces of training data 110 included in the training set through a plurality of iterations is referred to as one epoch.

As illustrated in FIG. 1, in stage 120, a training apparatus selects training data to be used to train the neural network 130 at a current iteration from the pieces of training data 110 included in the training set. When training the neural network 130, a configuration of training data to be used in an iteration may affect a recognition accuracy of the neural network 130. When a degree of recognizing a label by the neural network 130 that is being trained is lower than a degree of recognizing another label by the neural network 130, training data may need to be selected to improve a recognition accuracy, and the selected training data may be used in a subsequent iteration. The selecting of the training data is performed using a feature vector obtained from the hidden layer of the neural network 130.

When the training data is input to the input layer, the neural network 130 generates a feature vector corresponding to the training data from the hidden layer. When the pieces of training data 110 included in the training set are input to the neural network 130, a plurality of feature vectors corresponding to the pieces of training data 110 are obtained. In stage 140, clustering is performed based on the obtained feature vectors. The clustering refers to a process of grouping the feature vectors obtained from the hidden layer into a finite number of clusters. A result of the clustering is cluster information to be used to select training data to train the neural network 130.

An estimated value corresponding to the training data is output from the output layer of the neural network 130. In stage 150, a loss is calculated based on the estimated value and a correct value corresponding to the training data. A recognition accuracy of the neural network 130 for the training data is determined based on the calculated loss, and the training data to be used to train the neural network 130 is selected based on the recognition accuracy.

For example, when the loss exceeds a threshold value, the training apparatus may determine that the neural network 130 does not accurately recognize the training data, and identifies a cluster corresponding to the training data based on a feature vector of the training data. In an example, the training apparatus trains the neural network 130 using training data included in the identified cluster. For example, the training apparatus configures pieces of training data to be used in a subsequent iteration using only the training data included in the identified cluster, or configures a plurality of pieces of training data to be used in the subsequent iteration so that a rate of the training data included in the identified cluster is to be highest.

In stage 160, a training degree indicating how far the neural network 130 is trained is validated based on validation data included in a validation set. The validation set refers to a set distinguished from the training set, and includes pieces of validation data to validate the training degree of the neural network 130 that is trained through training data.

The training apparatus trains the neural network 130 using a cluster corresponding to validation data with a low recognition accuracy of the neural network 130 among the pieces of validation data included in the validation set. For example, the training apparatus may identify a cluster into which validation data erroneously recognized by the neural network 130 is classified most, and train the neural network 130 using training data included in the identified cluster. In an example, the training apparatus identifies the cluster based on a feature vector of the validation data. In an example, the training apparatus traisn the neural network 130 using validation data included in the identified cluster.

In an example, validation information based on validation data is calculated, and the validation information is represented by a performance index, such as, for example, a precision, a recall, an accuracy, an L1 error, an L2 error, a Euclidean distance, an average precision (AP), and a mean average precision (mAP). The precision refers to an index based on a number of pieces of data corresponding to true as a ground truth among pieces of data determined to be true through a suggested algorithm. The recall refers to an index based on a number of pieces of data determined to be true by determining data being a ground truth through a suggested algorithm. The accuracy refers to an index based on a number of pieces of data corresponding to a ground truth among pieces of data determined to be true and a number of pieces of data corresponding to an actual false among pieces of data determined to be false. The Euclidian distance refers to a distance between two points in a Euclidean space. The L1 error is a sum of absolute values of differences between correct values and estimated values. The L2 error is a sum of squares of differences between correct values and estimated values. The AP is calculated to be a mean value of precisions relative to all recall values from 0 to 1. In presence of a plurality of queries, the mAP is calculated to be a mean value of respective AP values for the queries. For example, when verifying a classifier configured to classify, using the mAP, a bird, an airplane, and a vehicle included in an image, a mean of an AP value for the bird, an AP value for the airplane, and an AP value for the vehicle is calculated to be an mAP.

In an example, the training apparatus configures the pieces of training data to be used in the subsequent iteration using the validation information based on the validation data. For example, the training apparatus identifies a cluster corresponding to validation data having a low recognition accuracy. The training apparatus then configures the pieces of training data to be used in the subsequent iteration only using training data included in the identified cluster or the validation data, or configure the pieces of training data so that a rate of the training data included in the identified cluster or the validation data is to be highest.

The operations described based on an iteration as a unit are applicable to operations based on an epoch as a unit. That is, configuring training data may be performed in each epoch as a unit. A training process to be described hereinafter indicates one iteration or one epoch.

Figure 2:
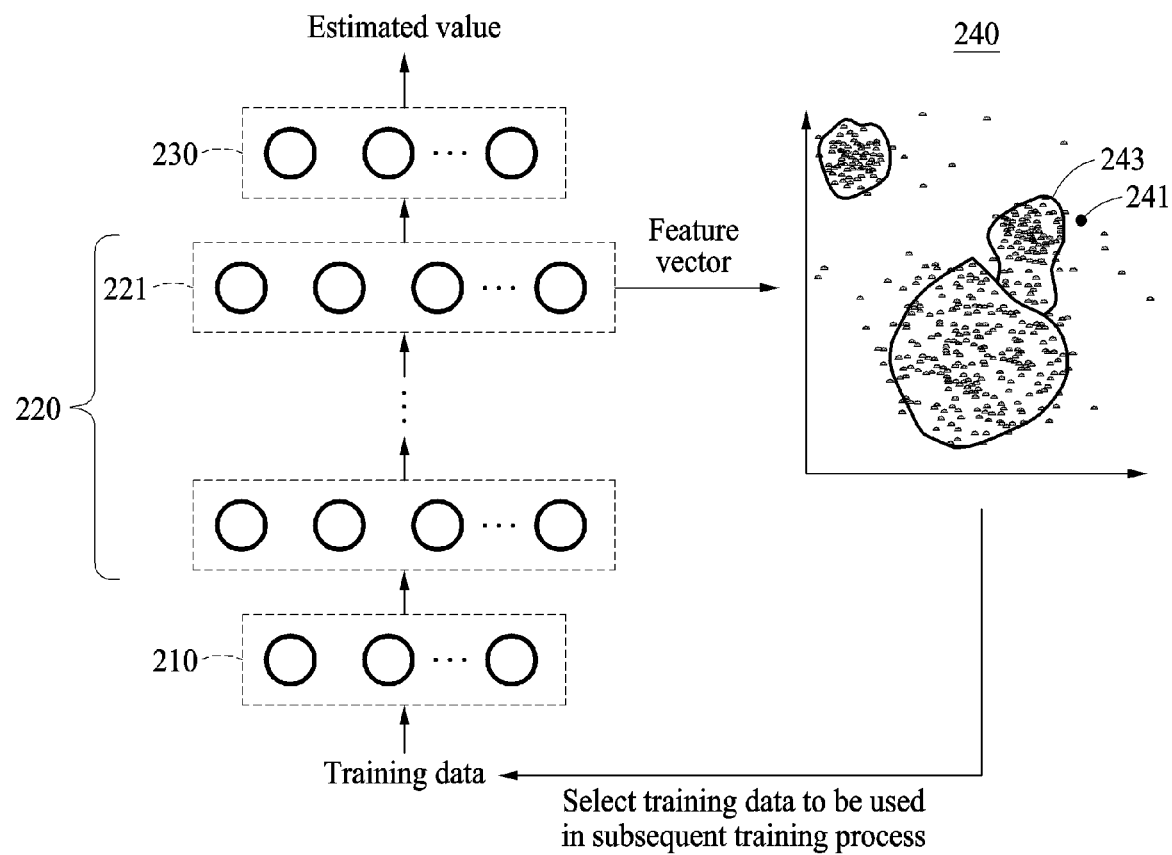
FIG. 2 is a diagram illustrating an example of a method of selecting training data to be used in a subsequent training process.

FIG. 2 is a diagram illustrating an example of a method of selecting training data to be used in a subsequent training process.

Referring to FIG. 2, a training apparatus selects training data to be used in a subsequent training process. Training data to be input to an input layer 210 is one of a plurality of pieces of training data to be used in a single training process. Hereinafter, for convenience of description, operations of the training apparatus will be described based on a single piece of training data among the pieces of training data to be used in the single training process.

In the example illustrated in FIG. 2, a neural network includes the input layer 210, a plurality of hidden layers 220, and an output layer 230. The training data of the neural network is input to the input layer 210. The output layer 230 outputs an estimated value of the training data. The training apparatus calculates a loss by comparing the estimated value and a correct value corresponding to the training data. In response to the loss not meeting a threshold, or the loss exceeding a threshold value, the training apparatus trains the neural network using a cluster corresponding to the training data. A method of identifying the cluster corresponding to the training data will be described in detail hereinafter.

The training apparatus obtains a feature vector 241 of the training data from a hidden layer 221 among the hidden layers 220. The hidden layer 221 is selected as a layer to fully generate an overall feature of the training data, for example, a second to last layer or a third to last layer among a plurality of layers included in the neural network. The hidden layer 221 may be differently determined based on a purpose of the neural network, for example, classification, detection, and segmentation, or other purposes.

The training apparatus identifies the cluster corresponding to the training data among a plurality of clusters based on the feature vector 241 of the training data. The clusters are generated by clustering a plurality of feature vectors of a plurality of pieces of training data included in a training set in a vector space 240. The feature vectors used for the clustering may be extracted from a same layer as the hidden layer 221.

For example, the training apparatus may arrange the feature vector 241 of the training data in the vector space 240, and identify a cluster 243 including the feature vector 241 or being closest to the feature vector 241 from the clusters. A method of identifying the cluster 243 corresponding to the feature vector 241 from the clusters will be described in greater detail with reference to FIG. 3.

The training apparatus trains the neural network using the cluster 243. The training apparatus selects training data included in the cluster 243, and trains the neural network using the selected training data in a subsequent training process. For example, the training apparatus configures a plurality of pieces of training data to be used in the subsequent training process using the training data included in the cluster 243, or configure the pieces of training data to be used in the subsequent training process so that a rate of the training data included in the cluster 243 is to be highest. In an example, the subsequent training process uses only the training data included in the cluster 243.

Figure 3:
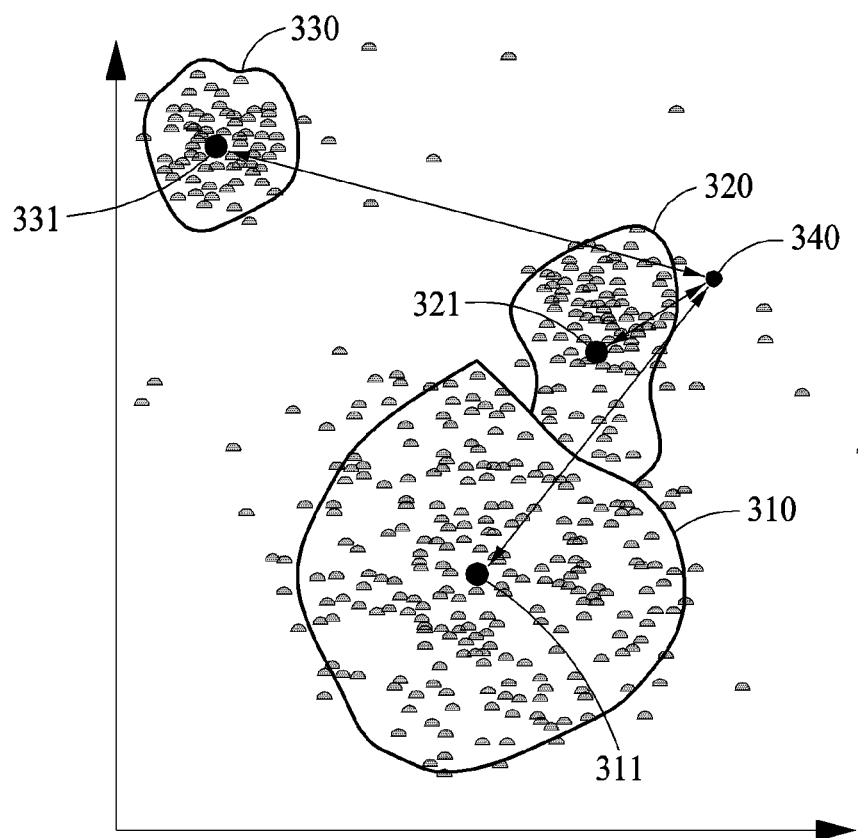
FIG. 3 is a diagram illustrating an example of a method of identifying a cluster corresponding to a feature vector.

FIG. 3 is a diagram illustrating an example of a method of identifying a cluster corresponding to a feature vector.

Referring to FIG. 3, a training apparatus identifies a cluster corresponding to a feature vector of training data from a plurality of clusters.

A vector space 300 refers to a space in which a plurality of feature vectors of a plurality of pieces of training data included in a training set is present, and is an n-dimensional space. In the example illustrated in FIG. 3, the vector space 300 is illustrated as a two-dimensional (2D) space for convenience of description. The feature vectors present in the vector space 300 are clustered, and thus a plurality of clusters, for example, a cluster 310, a cluster 320, and a cluster 330, is determined. The clusters 310, 320, and 330 are updated while a neural network is being trained.

As the neural network is trained, parameters included in the neural network are adjusted, and thus a feature vector to be obtained therefrom varies despite an input of the same training data to the neural network. Thus, by clustering feature vectors obtained in a training process of the neural network, for example, 1 epoch and 2 or higher epoch, locations and/or boundaries of the clusters 310, 320, and 330 are adjusted. As the clusters 310, 320, and 330 are updated, training data classified into one cluster in a training process is classified into another cluster in a subsequent training process.

In an example, the training apparatus performs such clustering using methods such as, for example, a hierarchy-based method or a hierarchical clustering method, a partitioning method, or a model-based method. The hierarchy-based method refers to a method of forming a hierarchy, for example, a tree, of clusters starting from each of the elements. In the hierarchy, each element is at one end, and a single cluster including all the elements is at another end. The partitioning method refers to a method of performing clustering without considering a hierarchy of clusters. In general, the partitioning method may determine a number of clusters after estimating how many clusters are obtained through partitioning. The model-based method refers to a method using a neural network configured to perform clustering.

The cluster information is stored after clustering. The cluster information to be stored may be a most recent value or a cumulative value. In an example, the cluster information includes, for example, a centroid of each cluster, boundary information, and a number of pieces of data included in each cluster. Such cluster information may include a centroid, an average, an outlier, a minimum value, a maximum value, and a distribution for each cluster. The outlier refers to a value that abnormally deviates from a feature vector distribution. The average, the minimum value, the maximum value, and the distribution refer to statistical values of feature vectors included in each cluster.

In one example, the training apparatus identifies a cluster corresponding to training data from a plurality of clusters based on a feature vector of the training data. As illustrated in FIG. 3, the training apparatus identifies a cluster including a feature vector 340 or being closest to the feature vector 340 among the clusters 310, 320, and 330. The training apparatus identifies the cluster including the feature vector 340 based on whether the feature vector 340 is present in a boundary of each of the clusters 310, 320, and 330. In another example, the training apparatus identifies the cluster closest to the feature vector 340 based on distances from the feature vector 340 to respective centroids 311, 321, and 331 of the clusters 310, 320, and 330. For example, the training apparatus identifies a cluster having a centroid separate from the feature vector 340 by a shortest distance from the clusters 310, 320, and 330. In another example, the training apparatus identifies the cluster closest to the feature vector 340 based on distances from the feature vector 340 to respective boundaries of the clusters 310, 320, and 330.

In the example illustrated in FIG. 3, the cluster 320 having the centroid 321 separate from the feature vector 340 by a shortest distance is identified from the clusters 310, 320, and 330 having the respective centroids 311, 321, and 331. The identified cluster 320 is used to train the neural network.

Figure 4:
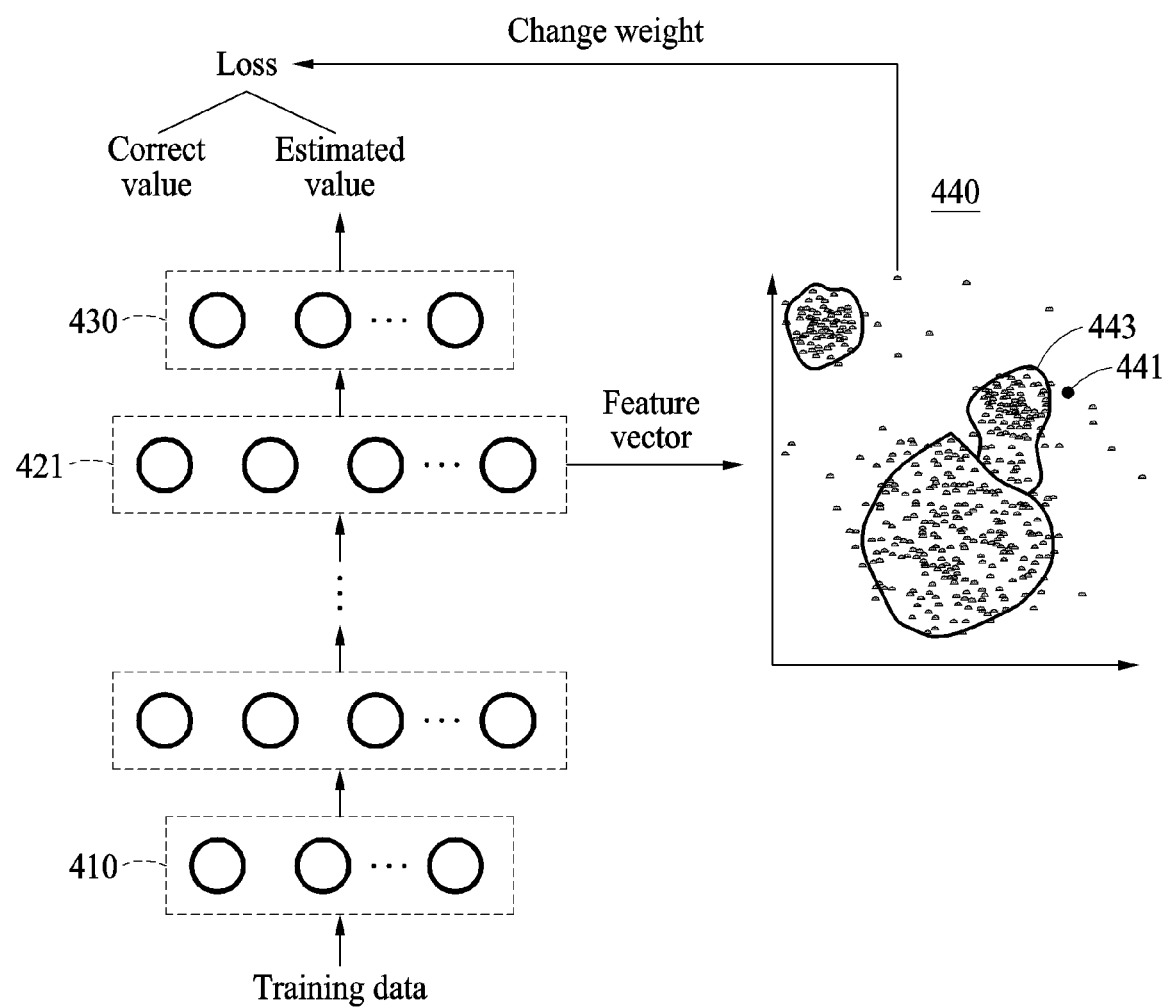
FIG. 4 is a diagram illustrating an example of a method of adjusting a weight of a loss in a training process.

FIG. 4 is a diagram illustrating an example of a method of adjusting a weigh of a loss in a training process.

Referring to FIG. 4, a training apparatus trains a neural network by adjusting a weight of a loss.

In one example, the training apparatus adjusts a weight of a loss of training data included in an identified cluster, and trains the neural network. In the example illustrated in FIG. 4, the training apparatus identifies a cluster 443 corresponding to training data obtained from a hidden layer 421 based on a feature vector 441 of the training data. The training apparatus determines a loss based on an estimated value that is estimated from the training data through the neural network and a correct value corresponding to the training data, and adjusts a weight of the loss in response to the loss exceeding a threshold value. The estimated value refers to a value output from an output layer 430 in response to the training data being input to an input layer 410.

For example, the training apparatus trains the neural network by setting a weight of a loss of training data included in the identified cluster 443 to be higher than a weight of a loss of other training data. The other training data refers to training data included in other clusters excluding the identified cluster 443. The training of the neural network using a loss indicates performing backpropagation.

In an example, the training apparatus sets, an adjustable range of a parameter associated with recognizing the training data included in the identified cluster 443 among parameters of the neural network to be greater than an adjustable range of another parameter, and performs the backpropagation. For example, when the adjustable range of the parameter associated with the recognizing of the training data included in the identified cluster 443 is set to be 100 and the adjustable range of the other parameter is set to be 50, a recognition accuracy for the training data included in the identified cluster 443 may be greatly improved compared to a recognition accuracy for the other training data through a backpropagation process. Thus, the training apparatus may improve the recognition accuracy for the training data included in the identified cluster 443 at a rapid speed, compared to the recognition accuracy for the other training data.

A loss described herein is calculated based on, for example, a Euclidean loss, a softmax loss, a L1 loss, a L2 loss, and a smooth L1 loss. The Euclidean loss is referred to as a sum-of-squares loss, and calculated as $\sum_{i=1}^{d}(x_i-t_i)^2$, in which $x_i$ denotes an estimated value and $t_i$ denotes a correct value. The softmax loss is calculated as $$-\sum_{i=1}^{d}\left[t_i\log\left(\frac{e^{x_i}}{\sum_{j=1}^{d}e^{x_j}}\right)+(1-t_i)\log\left(1-\frac{e^{x_i}}{\sum_{j=1}^{d}e^{x_j}}\right)\right].$$

The L1 loss is calculated based on absolute differences between estimated values and correct values, and referred to as a least absolute deviation (LAD). The L2 loss is calculated based on squared differences between estimated values and correct values, and referred to as a least square error (LSE). The smooth L1 loss is calculated by Equation 1 below.

$$\begin{cases} 0.5(x_i-t_i)^2 & \text{if } |x_i-t_i|<1 \\ |x_i-t_i|-0.5 & \text{otherwise} \end{cases}, \quad [\text{Equation 1}]$$

In addition, the correct value may be a class of input data, for example, a vehicle and a human, in response to a purpose of the neural network being classification, a location of an object in response to the purpose of the neural network being detection, or a class of each pixel in response to the purpose of the neural network being segmentation.

Figure 5:
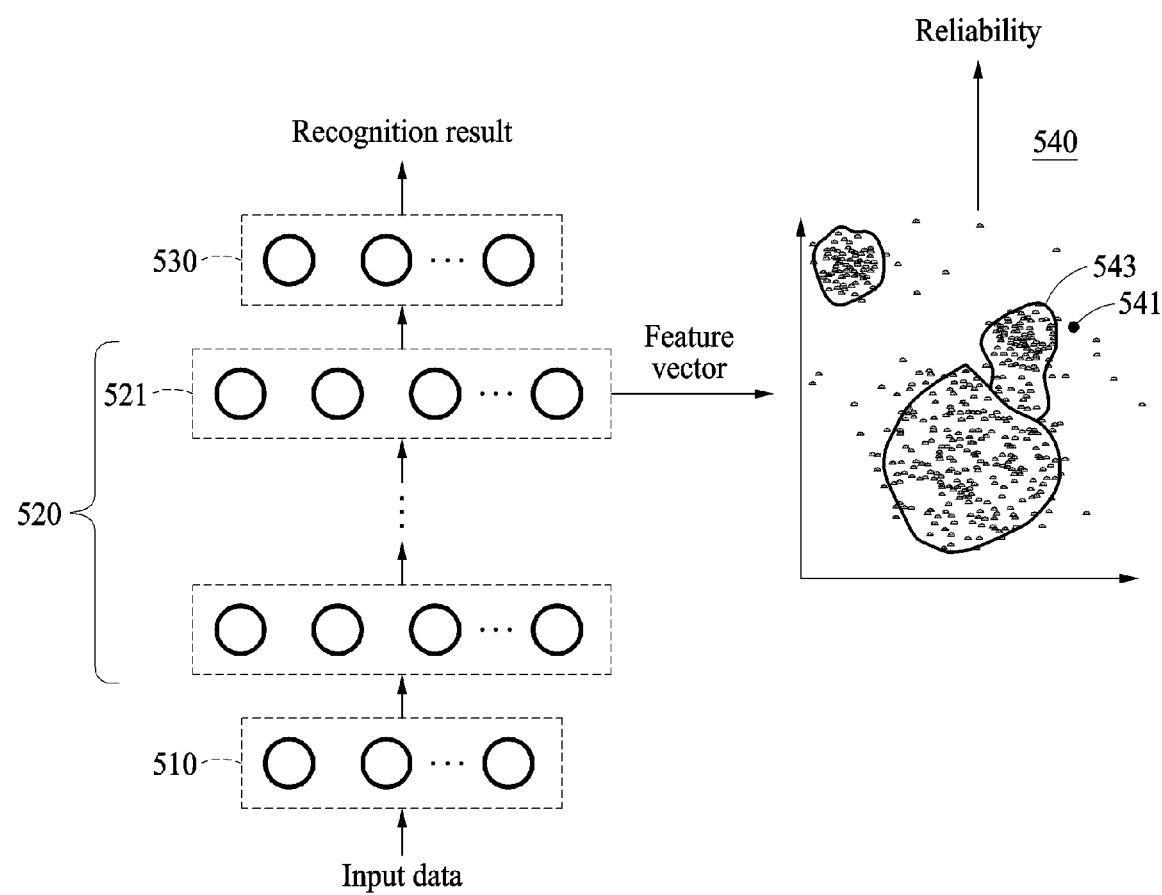
FIG. 5 is a diagram illustrating an example of a method of determining a reliability of a recognition result in a recognition process.

FIG. 5 is a diagram illustrating an example of a method of determining a reliability of a recognition result in a recognition process.

Referring to FIG. 5, a recognition apparatus determines a reliability of a recognition result for input data.

In an example, the recognition apparatus recognizes the input data using a trained neural network, and outputs a result of the recognizing. In the example illustrated in FIG. 5, when the input data to be recognized is input to an input layer 510 of the neural network, the recognition apparatus obtains a feature vector 541 generated from a hidden layer 521 of the neural network. The hidden layer 521 is one among a plurality of hidden layers 520 included in the neural network, and may be a same hidden layer as a hidden layer that generates a plurality of feature vectors to determine a plurality of clusters in a training process.

The recognition apparatus determines a reliability of the recognition result output from an output layer 530 using the feature vector 541 and the clusters. In an example, the clusters are determined in the training process. For example, the clusters may be determined by clustering the feature vectors of a plurality of pieces of training data in the training process of the neural network. The clusters and the feature vector 541 are arranged in a vector space 540.

The recognition apparatus determines the reliability of the recognition result based on a distance between the feature vector 541 and each of the clusters, or a similarity between the feature vector 541 and each of the clusters. The determining of the reliability of the recognition result will be described in detail with reference to FIG. 6.

Figure 6:
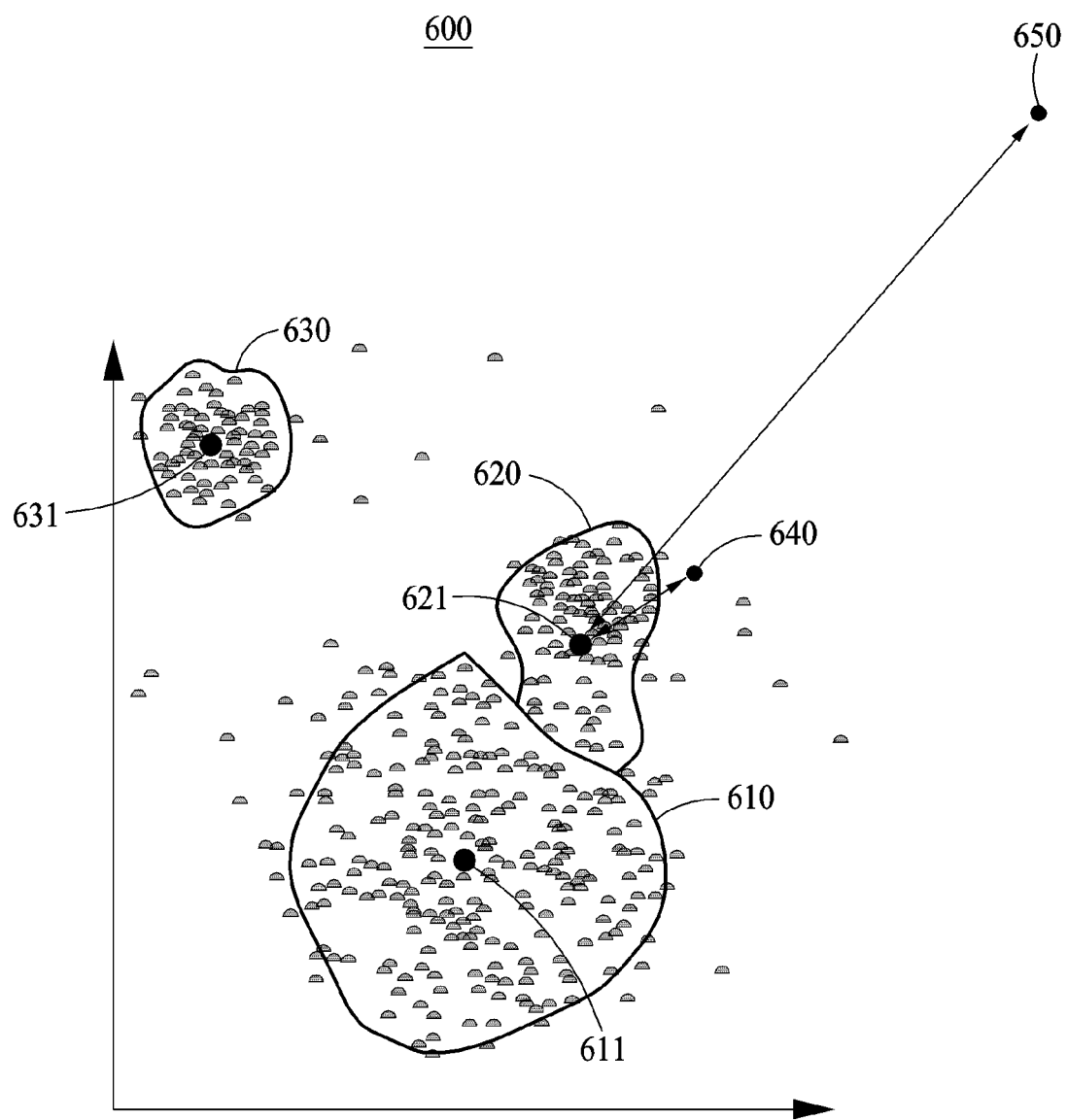
FIG. 6 is a diagram illustrating an example of a method of determining a reliability using a feature vector and a plurality of clusters.

FIG. 6 is a diagram illustrating an example of a method of a determining a reliability using a feature vector and a plurality of clusters.

Referring to FIG. 6, a recognition apparatus determines a reliability of a recognition result.

In the example illustrated in FIG. 6, a plurality of clusters, for example, a first cluster 610, a second cluster 620, and a third cluster 630, is determined in a vector space 600. A first feature vector 640 and a second feature vector 650 are respective feature vectors of different pieces of input data, for example, first input data and a second input data.

The clusters 610, 620, and 630 are determined in a training process of a neural network, and cluster information of the clusters 610, 620, and 630 is stored in advance and the recognition apparatus uses the stored cluster information.

In one example, the reliability is estimated based on a distance between a feature vector and a plurality of clusters. For example, in response to the distance between the feature vector and the clusters being shorter, the reliability may be estimated to be higher. The distance between the feature vector and the clusters is based on a distance between the feature vector and a cluster closest to the feature vector among the clusters.

As illustrated in FIG. 6, the second cluster 620 is closest to the first feature vector 640, and thus a reliability for the first input data is determined based on a distance between the first feature vector 640 and the second cluster 620. The second cluster 620 is also closest to the second feature vector 650, and thus a reliability for the second input data is determined based on a distance between the second feature vector 650 and the second cluster 620. The distance between the first feature vector 640 and the second cluster 620 is shorter than the distance between the second feature vector 650 and the second cluster 620, and thus the reliability for the first input data is estimated to be higher than the reliability for the second input data. In an example, a distance to a cluster is calculated based on a centroid of the cluster, for example, respective centroids 611, 621, and 631 of the clusters 610, 620, and 630. In another example, the distance to the cluster may be calculated based on a boundary of the cluster.

In an example, the first input data refers to data similar to training data used in the training process of the neural network, and the neural network may obtain a recognition result for the first input data at a high reliability. In an example, the second input data refers to data that is not similar to data used in the training process of the neural network. Thus, a reliability of a recognition result for the second input data may be determined to be low.

In an example, a similarity between a feature vector and a cluster may be determined based on a location of the feature vector and a location of the cluster in the vector space 600.

Figure 7:
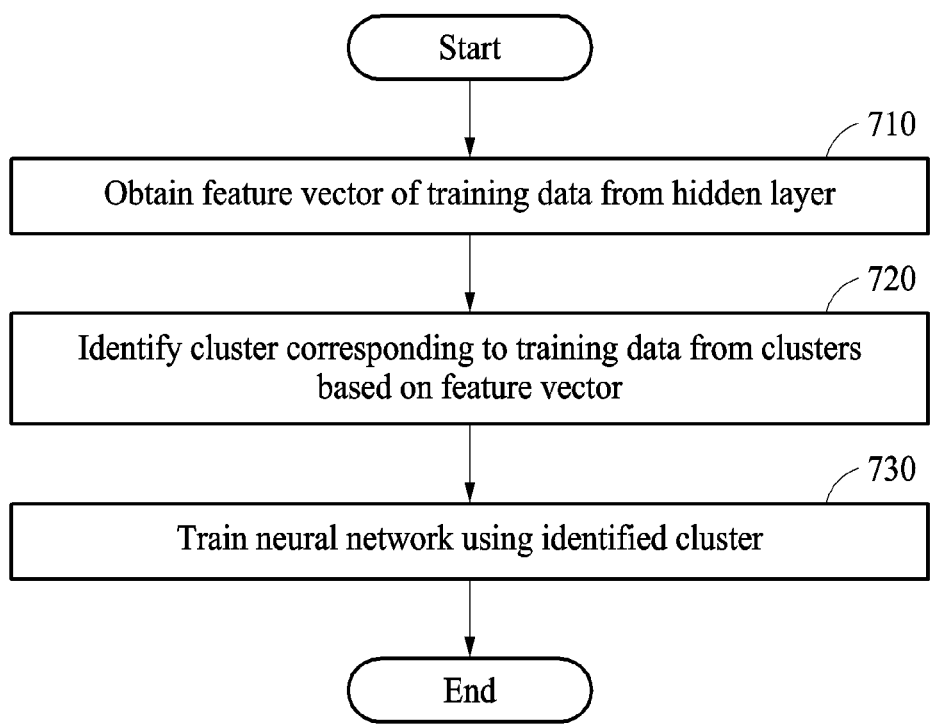
FIG. 7 is a diagram illustrating an example of a training method.

FIG. 7 is a diagram illustrating an example of a training method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 is also applicable to FIG. 7, and are incorporated herein by reference. Thus, the above description may not be repeated here.

Referring to FIG. 7, the training method is performed by a processor of a training apparatus.

In operation 710, in response to training data being input to an input layer of a neural network, the training apparatus obtains a feature vector generated from a hidden layer of the neural network.

In operation 720, the training apparatus identifies a cluster corresponding to the training data from a plurality of clusters based on the feature vector. The clusters may be determined based on a plurality of feature vectors of a plurality of pieces of training data included in a training set of the neural network. While a training process of the neural network is being performed, the clusters may be updated based on a feature vector obtained in the training process.

In operation 730, when an accuracy of recognition for the training data does not meets a threshold, the training apparatus trains the neural network using the identified cluster. In an example, the training apparatus trains the neural network using training data included in the identified cluster. In an example, the training apparatus trains the neural network by setting a weight of a loss of the training data included in the identified cluster to be higher than a weight of a loss of other training data.

In an example, the recognition accuracy includes a loss determined based on an estimated value output from the neural network in response to the training data and a correct value corresponding to the training data.

In addition, the training apparatus trains the neural network using a cluster corresponding to validation data with a lowest recognition accuracy of the neural network among a plurality of pieces of validation data included in a validation set of the neural network.

Figure 8:
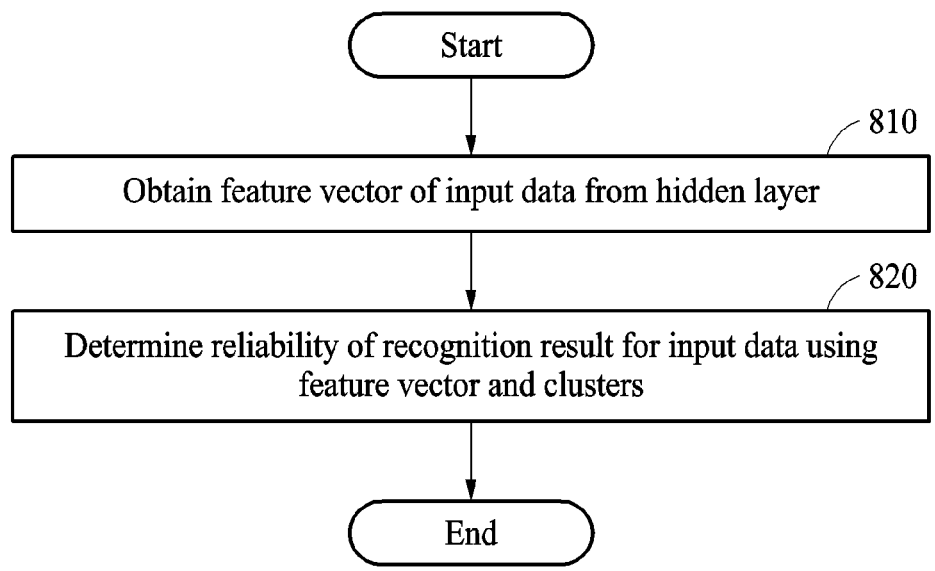
FIGS. 8 and 9 are diagrams illustrating examples of a recognition method.
Figure 9:
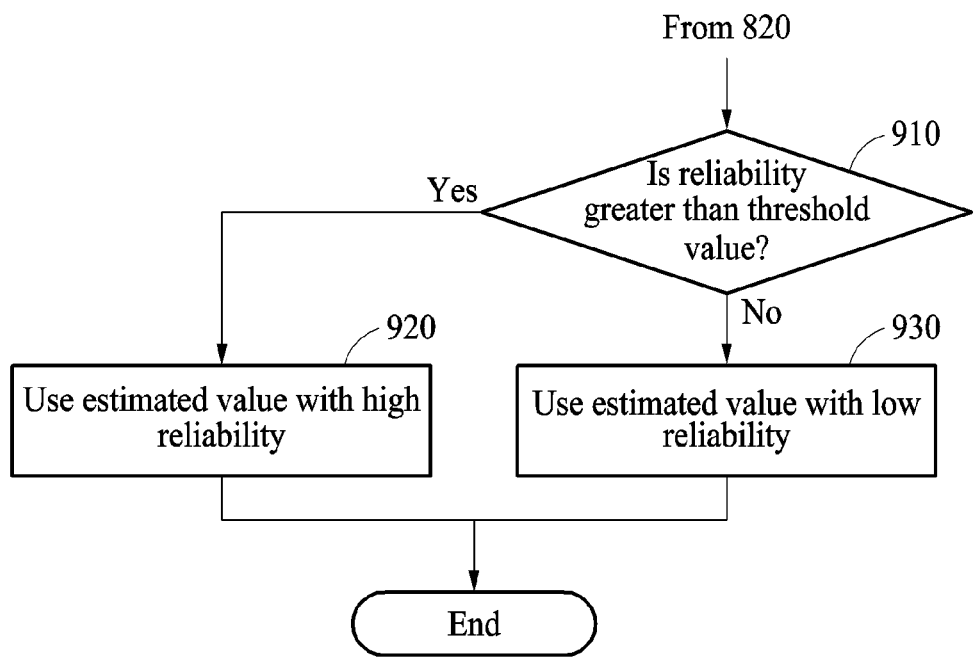

FIGS. 8 and 9 are diagrams illustrating examples of a recognition method. The operations in FIGS. 8 and 9 may be performed in the sequence and manner as shown, although the order of some operations may be changed or some of the operations omitted without departing from the spirit and scope of the illustrative examples described. Many of the operations shown in FIGS. 8 and 9 may be performed in parallel or concurrently. One or more blocks of FIGS. 8 and 9, and combinations of the blocks, can be implemented by special purpose hardware-based computer that perform the specified functions, or combinations of special purpose hardware and computer instructions. In addition to the description of FIGS. 8 and 9 below, the descriptions of FIGS. 1-7 is also applicable to FIGS. 8 and 9, and are incorporated herein by reference. Thus, the above description may not be repeated here.

Referring to FIG. 8, the recognition method is performed by a processor of a recognition apparatus.

In operation 810, when input data to be recognized is input to an input layer of a neural network, the recognition apparatus obtains a feature vector generated from a hidden layer of the neural network.

In operation 820, the recognition apparatus determines a reliability of a recognition result for the input data using the feature vector and a plurality of clusters. The clusters may be determined based on a plurality of feature vectors of a plurality of pieces of training data to train the neural network. The feature vectors of the pieces of training data may be obtained from the hidden layer generating the feature vector of the input data.

In an example, the recognition apparatus determines the reliability of the recognition result by calculating a distance between the feature vector and the clusters. The recognition apparatus sets the reliability of the recognition result to be higher in response to the distance between the feature vector and the clusters being shorter. In an example, the recognition apparatus estimates the reliability of the recognition result by calculating a similarity between the feature vector and the clusters.

FIG. 9 is a diagram illustrating an example of a method using a reliability. Each operation of FIG. 9 is performed by a recognition apparatus.

Referring to FIG. 9, in operation 910, the recognition apparatus determines whether the reliability exceeds a threshold value. The threshold value is determined differently depending on a type of the recognition apparatus.

In operation 920, in response to the reliability exceeding the threshold value, the recognition apparatus uses an estimated value with a high reliability. For example, when the recognition apparatus is an autonomous driving controller configured to determine an autonomous driving route by analyzing a forward-looking image obtained by capturing an image of a forward view of an autonomous vehicle, the recognition apparatus may detect an object present in front of the autonomous vehicle, for example, another vehicle and a human, or determine the autonomous driving route, by using the estimated value.

In operation 930, in response to the reliability being less than or equal to the threshold value, the recognition apparatus uses the estimated value with a low reliability. For example, when the recognition apparatus is the autonomous driving controller, the recognition apparatus may detect an object present in front of the autonomous vehicle or determine an autonomous driving route, by using another sensed value. In an example, the other sensed value is an output value of a light detection and ranging (LiDAR) sensor, instead of using the estimated value. Thus, the autonomous driving controller may determine a situation in which the object is not detected or the autonomous driving route is not determined normally using the forward-looking image, and continue autonomous driving using the other sensed value in such a situation.

Figure 10:
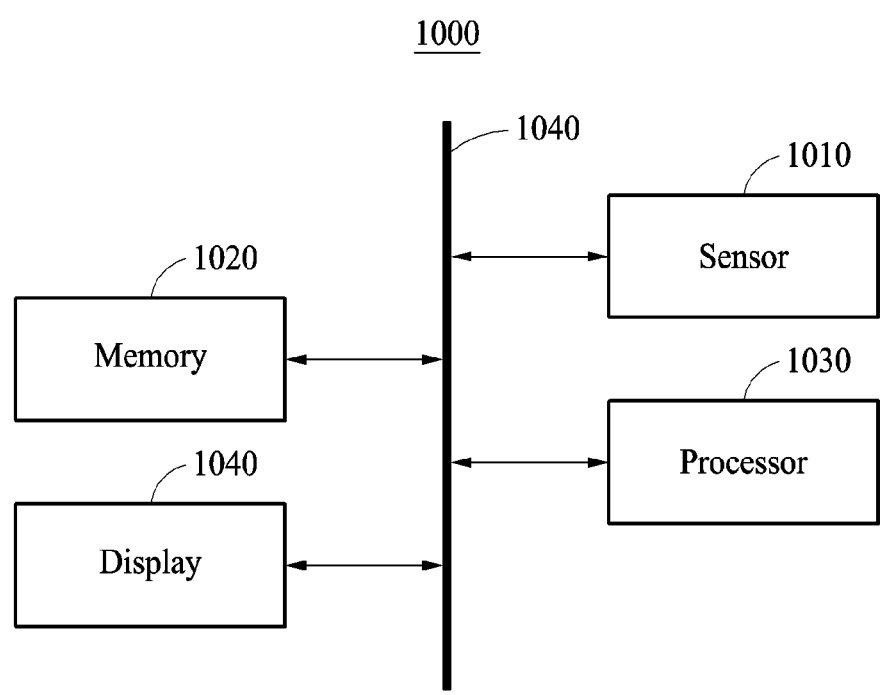
FIG. 10 is a diagram illustrating an example of an electronic apparatus.

FIG. 10 is a diagram illustrating an example of an electronic apparatus.

Referring to FIG. 10, an electronic apparatus 1000 includes a sensor 1010, a memory 1020, a processor 1030, and a display 1040. The sensor 1010, the memory 1020, and the processor 1030 communicates to one another through a bus 1040. The training apparatus and the recognition apparatus described above may be embodied as at least a portion of the electronic apparatus 1000.

The sensor 1010 includes, for example, an image sensor and a microphone, to sense image data and voice data. The sensor 1010 may detect an image through a method, for example, a method of converting an optical image to an electrical signal. An output of the sensor 1010 may be transferred to the processor 1030 or the memory 1020.

The memory 1020 may store parameters of the neural network described above and cluster information. In addition, the memory 1020 may include a computer-readable instruction. In response to the instruction stored in the memory 1020 being executed by the processor 1030, the processor 1030 may perform the operations described above.

The processor 1030 includes at least one unit or component described with reference to FIGS. 1 through 9, or perform at least one method described with reference to FIGS. 1 through 9. For example, the processor 1030 may obtain a feature vector generated from a hidden layer of the neural network when training data is input to an input layer of the neural network, identifies a cluster corresponding to the training data among a plurality of clusters based on the feature vector, and trains the neural network using the identified cluster in response to a recognition accuracy with respect to the training data not meeting a preset requirement. In addition, in response to input data to be recognized being input to the input layer of the neural network, the processor 1030 obtains a feature vector generated from the hidden layer of the neural network, and determines a reliability of a recognition result for the input data using the feature vector and the clusters.

According to examples described herein, by outputting a recognition result of a neural network for input data along with a reliability of the recognition result, using a recognition result with a low reliability, for example, an erroneous recognition result, may be effectively prevented.

The display 1040 displays the recognition result of a neural network for input data along with a reliability of the recognition result from the processor 1030. In an example, the display 1040 is a physical structure that includes one or more hardware components that provide the ability to render a user interface and/or receive user input. The display 1040 can encompass any combination of display region, gesture capture region, a touch sensitive display, and/or a configurable area. In an example, the display can be embedded in facial expression generating apparatus. In an example, the display 1040 is an external peripheral device that may be attached to and detached from the facial expression generating apparatus. The display 1040 may be a single-screen or a multi-screen display. A single physical screen can include multiple displays that are managed as separate logical displays permitting different content to be displayed on separate displays although part of the same physical screen. The display 1550 may also be implemented as an eye glass display (EGD), which includes one-eyed glass or two-eyed glasses. In an example, the display 1040 is a head-up display (HUD), a vehicular infotainment system, or a screen in the vehicle that uses augmented reality.

According to examples described herein, a training speed may be effectively improved by training a neural network using training data included in a cluster same as a cluster in which training data for which a recognition accuracy does not meet a preset requirement is included, for example, the training data identified to be similar to the training data for which the recognition accuracy does not meet the requirement.

The apparatuses, units, modules, devices, and other components illustrated in FIG. 10 that perform the operations described herein with respect to FIGS. 1, 2, 3, 4, 5, 6, 7, 8, and 9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

this disclosure includes specific examples, it will be apparent after an understanding of the disclosure of this application t that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method using a neural network, comprising:
obtaining a first feature vector generated from a hidden layer of the neural network, the first feature vector being generated based on first data processed by the neural network;
determining distances between the first feature vector and a plurality of clusters of feature vectors generated based on second data previously processed by the neural network;
determining a reliability of a result for the first data based on at least one of the distances, the result being output from an output layer of the neural network;
performing a subsequent operation using the result, in response to the reliability of the result exceeding a threshold value; and
performing the subsequent operation using an output value of a sensor, in response to the reliability of the result not exceeding the threshold value.

2. The method of claim 1, wherein the hidden layer is determined based on a purpose of the neural network.

3. The method of claim 1, wherein the determining of the reliability comprises:
determining the reliability of the result to be higher than a reliability of a result of third data, in response to a shortest distance among the distances being shorter than either one or both of a distance between a second feature vector and one of the clusters corresponding to the shortest distance and a distance between the second feature vector and another one of the clusters.

4. The method of claim 1, wherein the determining of the reliability comprises:
determining the reliability of the result by calculating a similarity between the first feature vector and a cluster corresponding to a shortest distance among the distances.

5. The method of claim 1, wherein the feature vectors are obtained from the hidden layer of the neural network.

6. The method of claim 1, wherein the distances between the first feature vector and the clusters are determined based on any one or any combination of any two or more of centroids of the clusters, boundary information of the clusters, numbers of pieces of data in the clusters, distributions of the clusters, outlier feature vectors among the feature vectors included in the clusters that abnormally deviate from feature vector distributions of the clusters, and statistical values of the feature vectors included in the clusters.

7. A non-transitory computer-readable medium storing instructions that, when executed by one or more processors, cause the one or more processors to perform the method of claim 1.

8. A training method of a neural network, comprising:
obtaining a feature vector generated from a hidden layer of the neural network, the feature vector being generated based on training data processed by the neural network;
determining distances between the feature vector and a plurality of clusters of feature vectors generated based on a plurality of training data in a training set previously processed by the neural network;
identifying a cluster corresponding to the feature vector among the clusters based on at least one of the distances; and
in response to an accuracy of a result for the training data being less than or equal to a threshold, selecting training data corresponding to the identified cluster from the plurality of training data in a training set, the result being output from an output layer of the neural network; and
training the neural network based on the selected training data.

9. The training method of claim 8, wherein the identifying of the cluster comprises:
identifying the cluster among the clusters corresponding to a shortest distance among the distances.

10. The training method of claim 8, wherein the training of the neural network comprises:
training the neural network by setting a weight of a loss of the training data in the identified cluster to be higher than a weight of a loss of other training data.

11. The method of claim 8, wherein the identifying the cluster comprises:
comparing a first distance between the first feature vector and the cluster to a second distance between the first feature vector and another cluster; and
identifying the cluster in response to the first distance being less than the second distance.

12. The training method of claim 8, wherein the plurality of clusters are updated based on updated feature vectors obtained in response to the training of the neural network.

13. The training method of claim 8, wherein the accuracy of the result comprises a loss determined based on a correct value corresponding to the training data and an estimated value output from the neural network in response to the training data being processed by the neural network.

14. The training method of claim 8, wherein the training of the neural network comprises:
training the neural network using training data corresponding to a cluster that corresponds to validation data having a lowest result accuracy among pieces of validation data in a validation set of the neural network.

15. The training method of claim 14, wherein the validation data is different from the training data.

16. An apparatus comprising:
one or more processors configured to:
obtain a first feature vector generated from a hidden layer of the neural network, t the first feature vector being generated based on first data processed by the neural network,
determine distances between the first feature vector and a plurality of clusters of feature vectors generated based on second data previously processed by the neural network,
determine a reliability of a result for the first data based on at least one of the distances, the result being output from an output layer of the neural network,
perform a subsequent operation using the result, in response to the reliability of the result exceeding a threshold value, and
perform the subsequent operation using an output value of a sensor, in response to the reliability of the result not exceeding the threshold value.

17. The apparatus of claim 16, wherein the hidden layer is determined based on a purpose of the neural network.

18. The apparatus of claim 16, wherein the one or more processors are further configured to determine the reliability of the result by calculating a similarity between the first feature vector and a cluster corresponding to a shortest distance among the distances.

* * * * *